United States Patent [19]

Fujimoto et al.

[11] 4,051,945

[45] Oct. 4, 1977

[54] ELECTRONIC TABULATOR FOR HIGH SPEED PRINTERS

[75] Inventors: Isao Fujimoto, Kunitachi; Takeshi Kasubuchi; Masahiko Aiba, both of Nara; Yoichi Shimazawa, Yamatokoriyama, all of Japan

[73] Assignees: Nippon Telegraph and Telephone Public Corporation; Sharp Kabushiki Kaisha, both of Tokyo, Japan

[21] Appl. No.: 603,924

[22] Filed: Aug. 12, 1975

[30] Foreign Application Priority Data

Aug. 12, 1974 Japan ................................ 49-92493

[51] Int. Cl.[2] .......................... B41J 21/00; H02J 9/06

[52] U.S. Cl. ...................................... 197/176; 197/19; 307/66; 340/173 DR

[58] Field of Search ........................... 197/19, 176–179; 307/66; 340/173 R, 173 DR

[56] References Cited

U.S. PATENT DOCUMENTS

| | | | |
|---|---|---|---|
| 3,812,945 | 5/1974 | Koplow et al. | 197/178 X |
| 3,705,392 | 12/1972 | Appelt | 340/173 DR |
| 3,832,697 | 8/1974 | Kashio | 197/176 X |
| 3,859,638 | 1/1975 | Hume | 340/173 R |
| 3,885,663 | 5/1975 | Suzuki | 197/176 |

*Primary Examiner*—Edgar S. Burr
*Assistant Examiner*—Paul T. Sewell
*Attorney, Agent, or Firm*—Birch, Stewart, Kolasch & Birch

[57] ABSTRACT

An electronic tabulator for use in non-impact printers and similar data terminal printout apparatus includes a random access memory (RAM) having a capability of storing the maximum of printing carriage positions to be tabulated at random order in response to TAB preset instructions, which in one preferred form may be implemented with MOS integrated circuit technology. While the carriage is moved in incremental steps along a given path in the course of the printing operation, address signals representative of the instantaneous positions of the carriage are developed from a carriage address counter. If there is evaluated an equivalence between the address signal and the preset signal of the memory, the memory produces its output which is in turn applied to the carriage bearing a printing member to indicate that the printing operation should be effected at that position. Because of the volatile nature of the MOS integrated circuit memory in the event of power failure and the like, a rechargeable battery is provided which activates the memory to retain the contents thereof even when power is off.

1 Claim, 2 Drawing Figures

ELECTRONIC TABULATOR FOR HIGH SPEED PRINTERS

Figure 1:
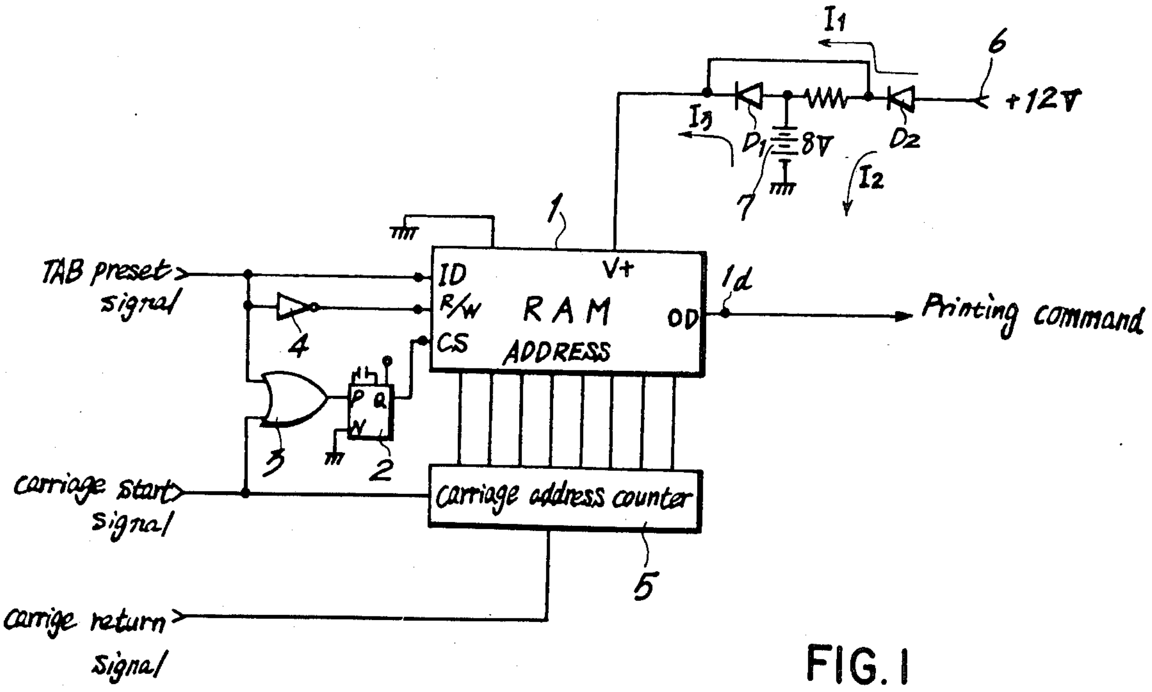

The present invention relates to a tabulator scheme for use in high speed printers and similar data terminal printout apparatus.

It is essential in the field of printout apparatus that a means is provided to store the positions to be printed and a means is provided to sense the positions of a printing carriage or head, whereby a printing instruction is derived to initiate the printing operation when the contents of the storage means coincides with the output of the sensing means. This is a matter of great importance for high speed printers, for example, ink jet system printers.

In the past, there have been suggested several approaches. The most popular approach consists of a mechanical means including a pawl for arresting the movements of the printing carriage at preselected positions. However, this approach is not effective for high speed non-impact printers such as ink jet system printers of the charge amplitude controlling type where it is required that the incremental carriage movements are rapid and smooth. Another prior art approach includes provision of a counter, the counts of which indicate the number of depressions of a space key and therefore stop the incremental advance of the carriage movements at desired positions to effect printout. Yet another approach has suggested employment of a presetting pinboard or a presetting wire. These approaches have the disadvantages that limitations are placed on the number of presettable positions and control circuits are rendered sophisticated. Although an electric memory using a multiplicity of magnetic cores was suggested as an alternate, this is not desirable because it suffers the disadvantage that circuit construction is too complicated compared with the storage capacity thereof.

It is a principal object of the present invention, therefore, to provide a new and improved a tabulating scheme of the type that stores the maximum of presettable positions by means of employment of an electronic memory even when a power supply is off.

Figure 2:
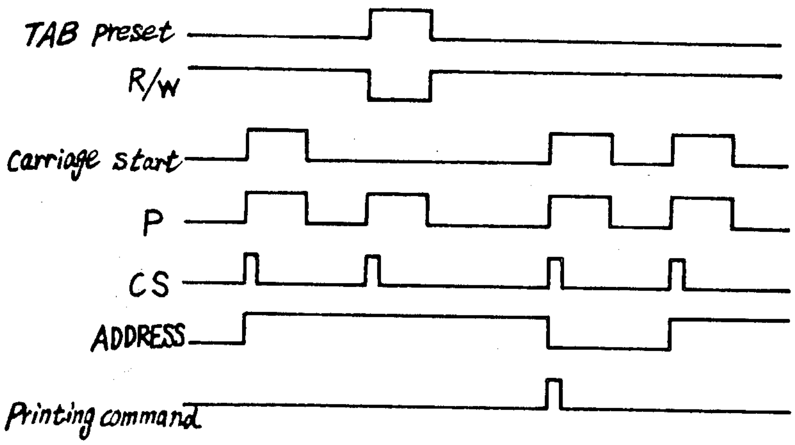

Other objects and many of the attendant advantages of the present invention will be readily appreciated as the same becomes better understood by reference to the following detailed description when considered in conjunction with the accompanying drawings in which like reference numerals designate like parts throughout the figures thereof and wherein:

FIG. 1 is a schematic block diagram showing one preferred form of the present invention; and FIG. 2 is a timing chart showing waveforms of signals occurring at various points in the embodiment of FIG. 1.

Referring now to FIG. 1, an illustrative embodiment of the present invention mainly comprises a random access memory (RAM) 1, a one-shot circuit 2 and a carriage address counter 5. RAM 1 has a storage capacity of bits corresponding the maximum of presettable tabulated positions. this may be implemented with MOS integrated circuit technology and, for example, made up of a commercially available RAM IC "INTEL 1101" manufactured by Intel Co. which enables battery-powered writing and reading functions. Needless to say, other various types of commercially available RAM IC's are applicable to the present system.

When it is desired to write information into the RAM 1, an address signal representative of the positions to be written is impressed thereon and a read-write signal via the input terminal R/W is held at a low level. Simultaneously, a TAB preset instruction via the input terminal ID is placed at the write mode and a chip enable signal via the input terminal CS is held at a high level. These conditions place the RAM 1 into the writing mode.

Reversely, when it is desired to read information out of the RAM 1, a desired address signal is supplied thereto and the R/W and CS signals are both held at a high level such that it produces its outputs of the high level or of the low level respectively through the output terminal 1d when information written into that address is high or low. In the given example, the high level output serves as a printing command to a printing member mounted on the printing carriage.

The one-shot circuit 2, when receiving either or both of a TAB preset instruction via its terminal P and a carriage start signal from an OR gate 3, produces the above discussed chip enable signal. It will be noted that the TAB preset instruction is applied as information to the input terminal ID and as the read-write signal via a NOT circuit 4 to the input terminal R/W.

The last primary component is the carriage address counter 5 which initiates its counting performances upon receipt of the carriage start signal and then produces its outputs representative of the positions of the carriage in one line as the address signals for RAM. Therefore, since the position of the carriage in one line always corresponds to one bit in the RAM 1, a certain specified position to be tabulated may be stored at a desired address in the RAM 1 by utilization of the TAB preset instruction. The carriage start signal created by the initial movement of the carriage permits the carriage address counter 5 to effect the counting performances and provide the address signals representative of the carriage positions. If the address signal coincides with a bit of the RAM 1 storing the tabulated position, the RAM 1 provides the printing command via the output terminal thereof for the printing member on the carriage. That is, the printing command informs a printing means that the printing operation should be carried out at that tabulated position. The waveforms of these signals occuring during the operation are illustrated in FIG. 2.

It is well known in the field of IC memory that storage may be maintained by a voltage level lower than a predetermined voltage level necessary for the writing and reading operations. In the illustrative embodiment, a voltage supply of +12V at a terminal 6 is applied thereto via a diode $D_2$ during the writing and reading operations. At this time a rechargeable battery 7 is charged by the voltage supply of +12V. In other words, the power supply of +12V establishes an IC enable current $I_1$ and a battery charge current $I_2$. Subsequently, during the information sustaining operation the power supply of +12V is cut off and the lower-voltage supply of +8V from the precharged battery 7 is effected thereon to establish an IC enable current $I_3$.

As regards the carriage drive mechanism in the ink jet system printer, see for example U.S. Pat. No. 3,769,630 "INK JET SYNCHRONIZATION AND FAILURE DETECTION SYSTEM" granted to Tames D. Hill et al and issued on Oct. 30, 1973 and U.S. Pat. No. 3,596,276 "INK JET PRINTER WITH DROPLET PHASE CONTROL MEANS" granted to Kenneth T. Lovelady et al and issued on July 27. 1971.

The present invention being thus described, it will be obvious that the same may be varied in many ways. Such variations are not to be regarded as a departure from the spirit and scope of the invention and all such modifications are intended to be included within the scope of the following claims.

What is claimed is:

1. In a tabulator for use in high speed printers to provide print command signals as a function of the coincidence between a stored carriage position signal and a generated carriage position signal, in combination:

random access memory means storing a plurality of signals representative of carriage positons to be tabulated;

a carriage counter means for providing address signals representative of detected carriage positions in response to generated carriage position signals;

said random access memory means being responsive to the coincidence of said position address signals and said stored carriage position signals for providing a printing command signal;

power supply means driving said random access memory means and sustaining the information stored therein;

a rechargeable battery; and circuit means continuously interconnecting said battery with said power supply means and said random access memory means to simultaneously charge said battery and enable and sustain said memory means by said power supply means when said power supply means is operative and sustain said memory by said battery when said power supply means is inoperative;

wherein said power supply means, when operative, has a first terminal voltage and wherein said battery means has a second terminal voltage of lesser magnitude than said first; and wherein said circuit means comprises first and second diode means each having an input and output side and each connected in the forward direction thereof in series from said power supply adjacent said first diode means to said random access memory means adjacent said second diode means;

said battery having one terminal thereof connected to the output side of said first diode means and the input side of said second diode means;

said random access memory means receiving power from said power source through both said diode means and said battery being charged from said power source through said first diode means; and said random access memory means receiving power from said battery through said second diode means upon failure of said power source.

* * * * *